United States Patent

Horneck

(10) Patent No.: US 9,908,483 B2
(45) Date of Patent: Mar. 6, 2018

(54) MOTOR VEHICLE

(71) Applicant: GM GLOBAL TECHNOLOGY OPERATIONS LLC, Detroit, MI (US)

(72) Inventor: Michael Horneck, Ruesselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/170,394

(22) Filed: Jun. 1, 2016

(65) Prior Publication Data

US 2016/0355144 A1 Dec. 8, 2016

(30) Foreign Application Priority Data

Jun. 2, 2015 (DE) .................. 10 2015 006 838

(51) Int. Cl.
| | |
|---|---|
| *B62D 27/02* | (2006.01) |
| *B60R 13/02* | (2006.01) |
| *F16B 5/02* | (2006.01) |
| *F16B 33/00* | (2006.01) |
| *F16B 37/02* | (2006.01) |
| *F16B 37/04* | (2006.01) |

(52) U.S. Cl.
CPC .......... *B60R 13/0206* (2013.01); *B60R 13/02* (2013.01); *F16B 5/02* (2013.01); *F16B 33/004* (2013.01); *F16B 37/02* (2013.01); *F16B 37/043* (2013.01)

(58) Field of Classification Search
CPC ....... B60R 13/0206; B60R 13/02; F16B 5/02; F16B 33/004; F16B 37/02; F16B 37/043
See application file for complete search history.

(56) References Cited

U.S. PATENT DOCUMENTS

| | | | |
|---|---|---|---|
| 2,883,228 A | | 4/1959 | Roberts |
| 6,594,870 B1 * | | 7/2003 | Lambrecht ............ F16B 5/0628 24/297 |

(Continued)

FOREIGN PATENT DOCUMENTS

| | | |
|---|---|---|
| DE | 102005018833 A1 | 1/2006 |
| DE | 102009031533 A1 | 2/2010 |

(Continued)

OTHER PUBLICATIONS

German Patent Office, German Search Report for German Application No. 102015006838.5, dated Dec. 21, 2015.

*Primary Examiner* — Lori L Lyjak
(74) *Attorney, Agent, or Firm* — Lorenz & Kopf LLP

(57) ABSTRACT

A device for fastening a paneling part to a body structure, particularly an interior body panel, of a motor vehicle and the body structure with an inner side facing toward the paneling part and an outer side facing away from the paneling part. The device includes a first fastening component for fastening to an opening in body structure. The first fastening component has a first section for bearing on the outer side of the body structure and a second section for arrangement in the area of the inner side of the body structure. A second, rod-like fastening component fastens the paneling part to the second fastening component. The second section of the first fastening component is constructed in such manner that the second section can be passed through the opening in the body structure.

18 Claims, 7 Drawing Sheets

(56) References Cited

U.S. PATENT DOCUMENTS

| | | | |
|---|---|---|---|
| 7,114,221 B2 * | 10/2006 | Gibbons | ................ F16B 5/065 24/289 |
| 8,388,289 B2 | 3/2013 | Mazur et al. | |
| 8,469,438 B2 | 6/2013 | Mazur et al. | |

FOREIGN PATENT DOCUMENTS

| | | |
|---|---|---|
| DE | 102010033849 A1 | 2/2012 |
| FR | 2883051 A1 | 9/2006 |
| WO | 2008152312 A1 | 12/2008 |
| WO | 2013167766 A1 | 11/2013 |

* cited by examiner

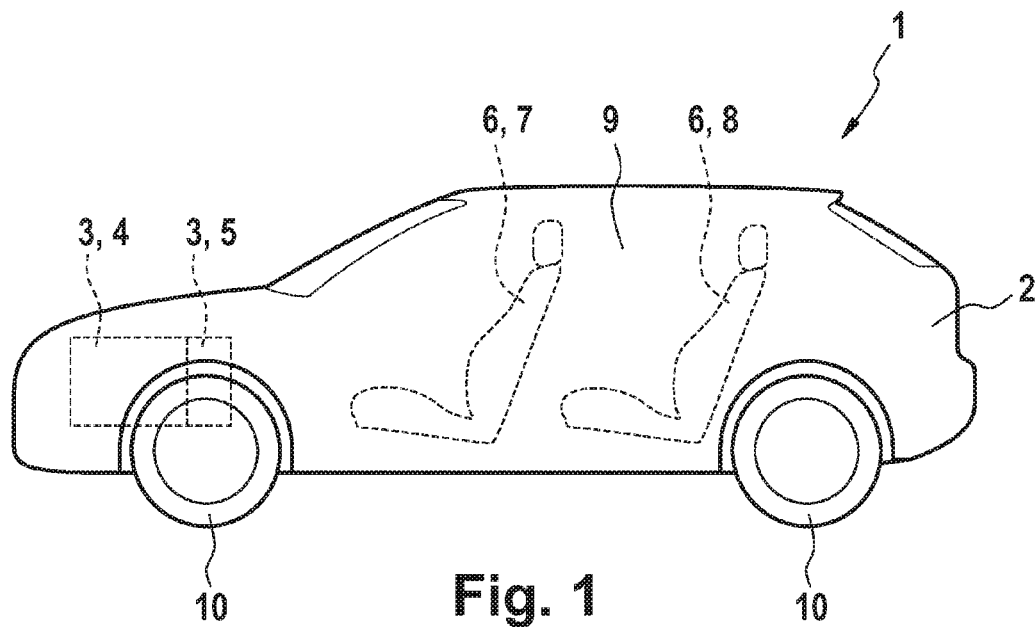
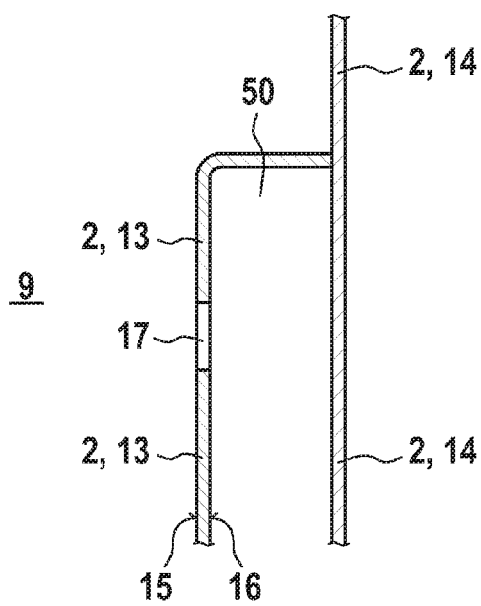
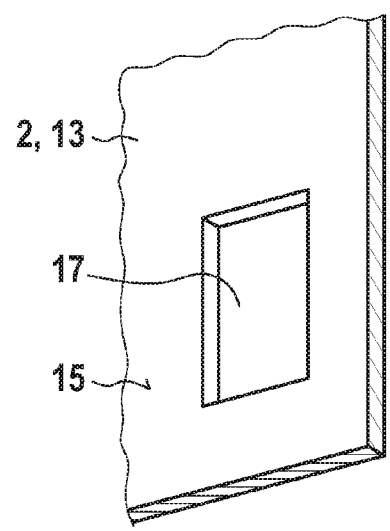
Fig. 1
Fig. 2
Fig. 3

MOTOR VEHICLE

CROSS-REFERENCE TO RELATED APPLICATION

This application claims priority to German Patent Application No. 102015006838.5, filed Jun. 2, 2015, which is incorporated herein by reference in its entirety.

TECHNICAL FIELD

The present disclosure relates to a device for fastening a paneling part, a motor vehicle incorporating the paneling part, and a method for manufacturing a motor vehicle with the paneling part.

BACKGROUND

Motor vehicles have a body structure that delimits an interior space. Particularly, the body structure consists of an interior body panel and an exterior body panel in the area of the interior space, for example at the A, B and C pillars and at the doors. The exterior body panel defines the external limits of the motor vehicle and the interior body panel is fastened to the exterior body panel inside the exterior body panel. In this context, the interior body panel may also be a skeleton or a steel structure of any design. Many paneling parts are fastened to the interior body panel, forming an interior cladding that defines the limits of the interior space. The paneling parts are fastened to the interior body panel by a large number of detachable fastening elements. The fastening elements may be for example retaining clips or screws.

If the motor vehicle is involved in an accident, considerable deceleration values, and consequently substantial forces are generated, with which the components of the motor vehicle are slowed down. In such an event, the fastening elements are not strong enough to guarantee that the paneling parts will remain fastened to the body structure. However, it is important to prevent paneling parts from becoming detached, i.e., a significant relative movement between the paneling parts and the body structure, both to prevent injuries to the passengers and to ensure that the airbags can be deployed without obstruction. For this reason, it is known to use additional devices to fasten the paneling parts to the body structure, particularly to the interior body panel, thereby ensuring that even if the motor vehicle is involved in an accident, the paneling parts undergo little if any movement relative to the body structure, so that the airbags can be deployed without obstruction and injuries caused by detached paneling parts can be prevented.

A retaining clip for attaching a paneling part to a body structure element is known from DE 10 2010 033 849 A1. The clip includes an anchoring section for attaching the retaining clip to the body structure element, and a retaining section to which an engaging element can be attached. The retaining section is elongated and curved. A device for fastening a paneling part to an unmachined component of motor vehicle is also known from DE 10 2005 018 833 A1. The device has a seating part that protrudes from the inside of the paneling part and is secured to the unmachined component via a fastening element, and through which an element aligned transversely to the fastening direction of the paneling part extends. A retaining element fastened to the unmachined component protrudes towards the inside of the paneling part and the element aligned transversely to the fastening direction of the paneling part passes through the retaining element. A device for fastening a furnishing element to a body structure element is also known from FR 2 883 051. The device includes a first and a second piece.

SUMMARY

In view of the above, the present disclosure provides a device for fastening a paneling part, a method for manufacturing a motor vehicle and a motor vehicle in which a paneling part remains sufficiently attached to the body structure even if the motor vehicle is involved in an accident. The device can be assembled easily in the vehicle, and is inexpensive to manufacture.

In particular, a device for fastening a paneling part to a body structure, particularly an interior body panel of a motor vehicle is disclosed. The body structure has an inner side facing toward the paneling part and an outer side facing away from the paneling part, including a first fastening component for fastening to an opening in the body structure. The first fastening component has a first section for bearing on the exterior of the body structure and a second section for arrangement in the area of the interior of the body structure. A second, rod-like fastening component fastens the paneling part to the second fastening component. The second section of the first fastening component is constructed in such manner that the second section can pass through the opening in the body structure. The second section is able to pass through the opening in the body structure particularly due to the geometry of the second section and/or because of a deformability of the second section. In a further variant, the diameter of the second section is smaller than the diameter of the opening, in particular without taking into account at least one deformable engaging element.

The first and second fastening components are advantageously connected to one another either indirectly or indirectly.

In a supplementary embodiment, each paneling part is fastened to one, particularly only one, device on the body structure. In a supplementary embodiment, the first fastening component has at least one, preferably deformable, engaging element for bearing on the inner side of the body structure, so that after the first fastening component has been fastened the at least one engaging element bears on the inside of the body structure in the area of the opening, and the second section bears indirectly or directly on the outside of the body structure, and the second section is arranged inside the opening, so that the first fastening component is fastened to the body structure. The first fastening component is thus fastened to the body structure not only in positive-locking but preferably also in force-locking manner.

The device preferably includes an intermediate component that may be arranged in the area of the interior of the body structure, particularly between the paneling part and the first fastening component. In a variant, the intermediate component is constructed as a disc with a hole or a ring with an annular hole for arranging the second rod-like fastening component inside the hole or the annular hole, or the intermediate component is constructed as an intermediate part having a cavity for accommodating at least part of the second section of the first fastening component.

The second rod-like fastening component is advantageously constructed as a screw with an external thread, a bolt, a pin or a rivet.

In a further embodiment, a connector is formed on the second section of the first fastening component or on the intermediate component to create a connection with the at least one second rod-like fastening component, so that the paneling part is connected to the first fastening component via the second rod-like fastening component due to the connection between the at least one second rod-like fastening component and the connector. In a further variant, the first fastening component is constructed as a single part or in two parts. The second fastening component is advantageously constructed as a single part.

A method according to the present disclosure for manufacturing a motor vehicle includes provide an unmachined body structure element as a body structure having an exterior body panel and an interior body panel having at least one opening formed therein. At least three wheels, at least one seat, at least one drive motor and at least one paneling part are provided as vehicle components. The at least one paneling part is fastened to the interior body panel with a device, so that the interior body panel has an internal side facing toward the paneling part and an external side facing away from the paneling part. A second section of a first fastening component of the device is passed through the opening in the interior body panel from the outside to the inside and a first section of the first fastening component is then brought to bear indirectly or directly on the outside of the interior body panel. The at least one paneling part is then fastened indirectly or directly to the first fastening component with a second, rod-like fastening component. Alternately, the second, rod-like fastening component is then fastened at a distance from the first fastening component, so that, particularly during or after an accident, any movement of the at least one paneling part relative to the body structure is blocked by the second, rod-like fastening component after the at least one paneling part has travelled a certain distance. In particular, the at least one paneling part is fastened to the interior body panel with the device described in this application for patent protection.

In a further variant, at least one engaging element on the second section is elastically deformed and then returns to its original shape elastically while the second section of the first fastening component is being passed through the opening, so that the at least one engaging element bears on the inside of the interior body panel after it has elastically regained its shape. In a supplementary variant, the second, rod-like fastening component is passed through a hole in the panel and connected to the second section of the first fastening component or to an intermediate component. In a further variant, the second, rod-like fastening component is in the form of a screw with an internal thread and is screwed as a connector to the second section of the first fastening component, or with the internal thread as the connector to the intermediate component.

In a further variant, an intermediate component is provided, and the intermediate component is arranged in the area of the inside of the interior body panel, particularly between the paneling part and the second section of the first fastening component, in particular the intermediate component is clamped between the paneling part and the second section of the first fastening component with a compressive force due to a tensile force in the second rod-like fastening component.

A motor vehicle according to the present disclosure, includes a body structure, a drive motor, particularly an electric motor and/or internal combustion engine, at least one seat, at least one paneling part that is fastened to an interior body panel by at least one device, wherein the device is in the form of a device described in this application for patent protection. In an additional variant, the motor vehicle includes a plurality of paneling parts.

In a further embodiment, a hole is provided in the paneling part to enable the rod-like second fastening component to pass through. In a supplementary variant, the first fastening component is made of metal, particularly steel. The first fastening component is advantageously made from a reshaped metal sheet, particularly entirely. In a supplementary variant, the first section of the first fastening component is in the form of a flange or a sheet metal section. In a further embodiment, the paneling part is fastened with the device to the body structure, particularly the interior body panel, as a door and/or A-pillar and/or B-pillar and/or C-pillar.

In an additional embodiment, the intermediate component is a supplementary component added to complete the paneling part, or the intermediate component is constructed as a single part with the paneling part, in particular, the intermediate component is manufactured by injection molding from plastic together with the paneling part. The intermediate component is preferably made from plastic. In a supplementary variant, the rod-like second fastening component is made from metal, particularly steel. In a further variant, the second section of the first fastening component has a pass through hole for passing through and disposing the second, rod-like fastening component inside the pass through hole.

In an additional variant, the device includes a gasket for sealing the opening after the first fastening component has been fastened in the opening in the body structure, particularly the interior body panel. In an additional variant, the opening in the body structure is sealed after the first fastening component has been arranged in the opening, so that no moisture or liquid can get into the interior space of the motor vehicle through the opening from an intermediate cavity between the exterior body panel and the interior body panel.

In a supplementary variant, an internal thread is conformed on the second section of the first fastening component or on the intermediate part as a connector for screwing together with the external thread of the screw, so that screwing the screw into the internal thread has the effect of fixing the paneling part in place by compressive pretension between the screw, particularly a screw head, and the first fastening component, and preferably fixing the intermediate component in place by compressive pretension between the paneling part and the second section of the first fastening component.

In a further embodiment the unmachined body structure is created by providing parts of the unmachined body structure and connecting the parts of the unmachined body structure to form the unmachined body structure in at least one joining process, particularly welding or adhesive bonding. The unmachined body structure is advantageously cleaned in a cleaning system and the unmachined body structure is warmed in a cathodic immersion painting furnace. In a supplementary variant the unmachined body structure undergoes an electrochemical immersion painting process, particularly cathodic electro-immersion painting and/or phosphatizing, after the unmachined body structure has been cleaned in the cleaning system and before the unmachined body structure is warmed in the cathodic immersion painting furnace.

In a further embodiment, the unmachined body structure is painted after the cathodic immersion painting furnace and/or parts of the unmachined body structure are produced from metal and/or plastic and/or a sandwich panel. In this way, the interior body panel and the exterior body panel both undergo the same painting and/or immersion painting process. In a further variant, the parts of the unmachined body structure are produced by rolling metal, particularly steel and/or a light metal such as aluminum, preferably a metal sheet from a metal coil, severing the unrolled metal into parts, and shaping the parts. In this way, the metal parts are provided from steel and/or light metal for example, particularly aluminum, and/or from plastic, and the interior body panel and the exterior body panel are constructed from the parts.

BRIEF DESCRIPTION OF THE DRAWINGS

The present disclosure will hereinafter be described in conjunction with the following drawing figures, wherein like numerals denote like elements.

FIG. 1 is a side view of a motor vehicle;

FIG. 2 is a cross section through a body structure of the motor vehicle with an interior body panel and an exterior body panel;

FIG. 3 is a view of the interior body panel with an opening;

DETAILED DESCRIPTION

Figure 4:
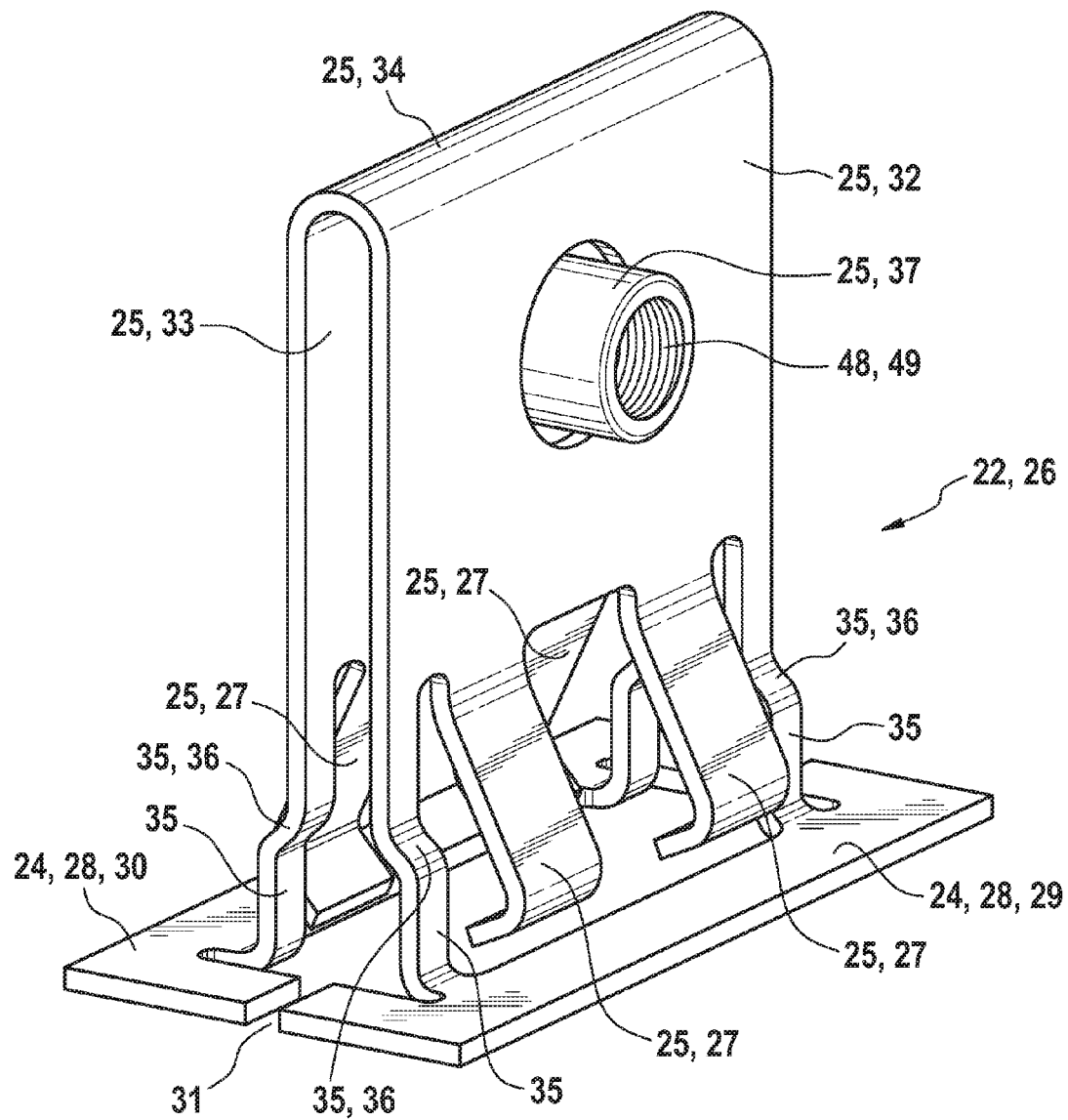
FIG. 4 is a view of a first fastening component of an embodiment of a device for fastening a paneling part.
Figure 5:
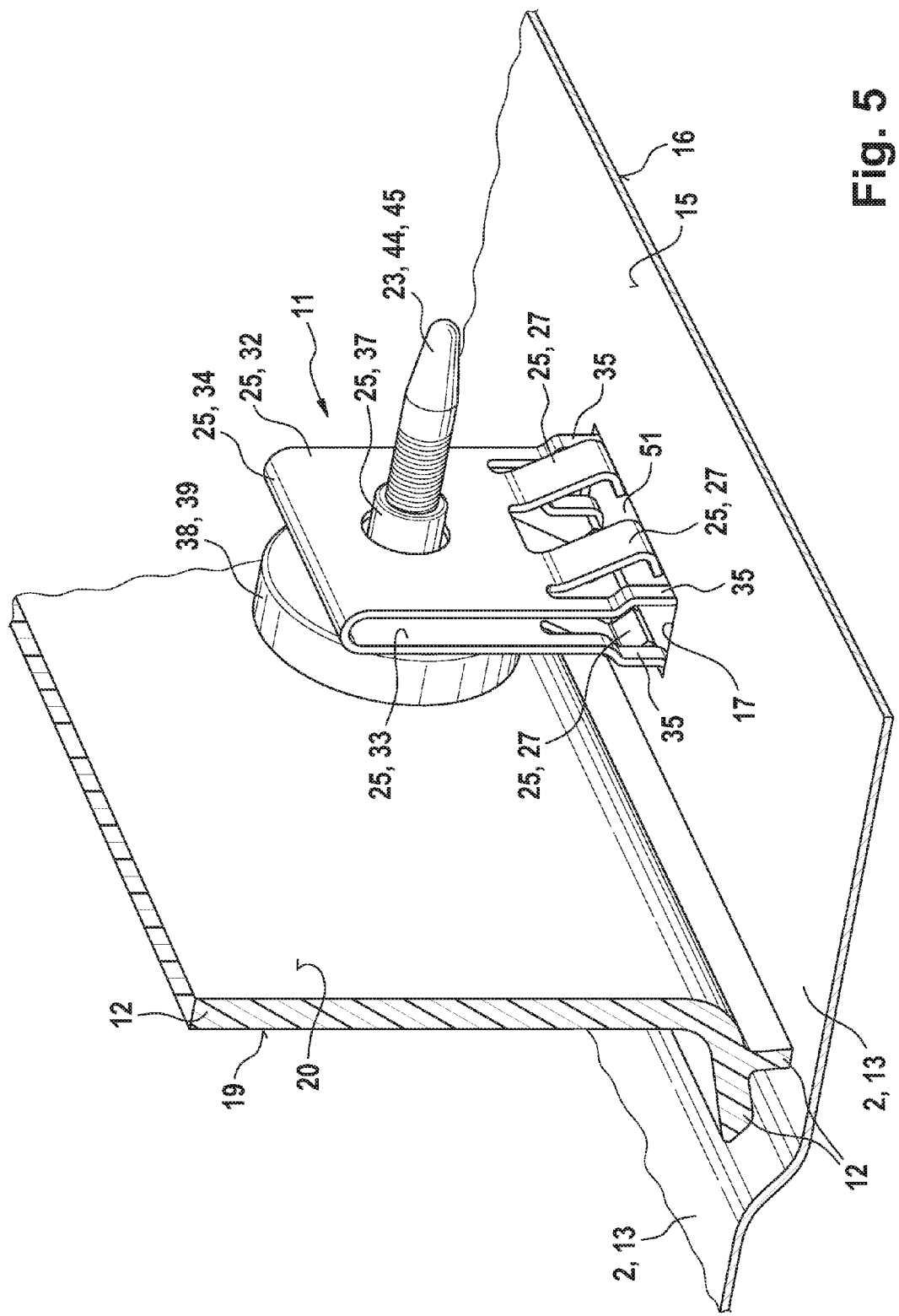
FIG. 5 is a first view of the device for fastening the paneling part of FIG. 4.
Figure 6:
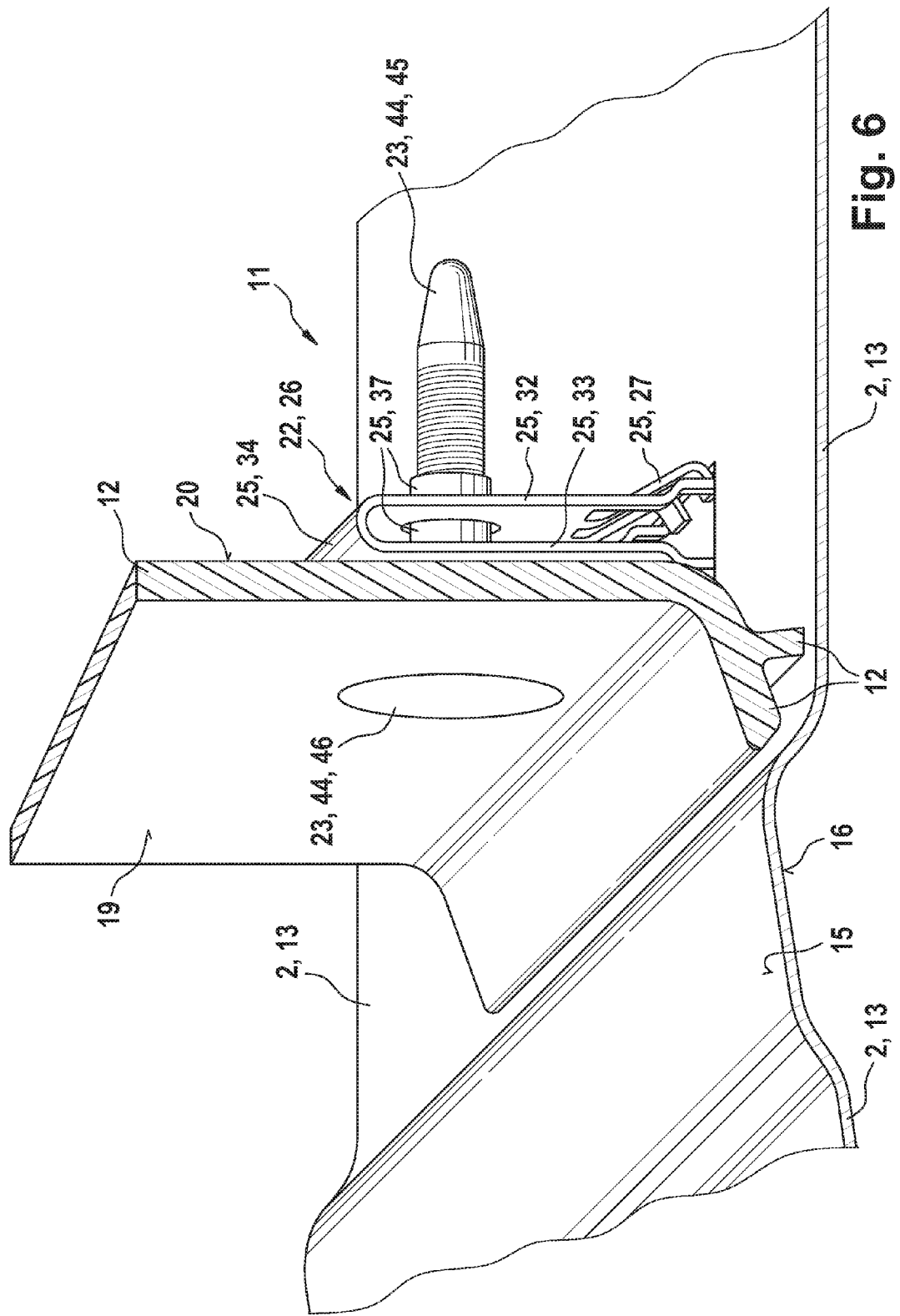
FIG. 6 is a second view of the device for fastening the paneling part of FIG. 4.
Figure 7:
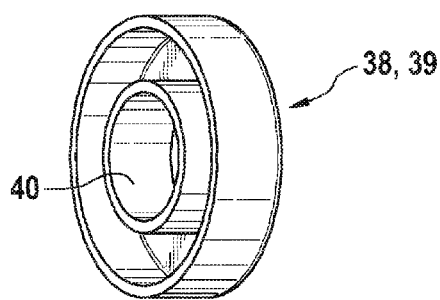
FIG. 7 is a view of an intermediate component of the device of FIG. 5.
Figure 8:
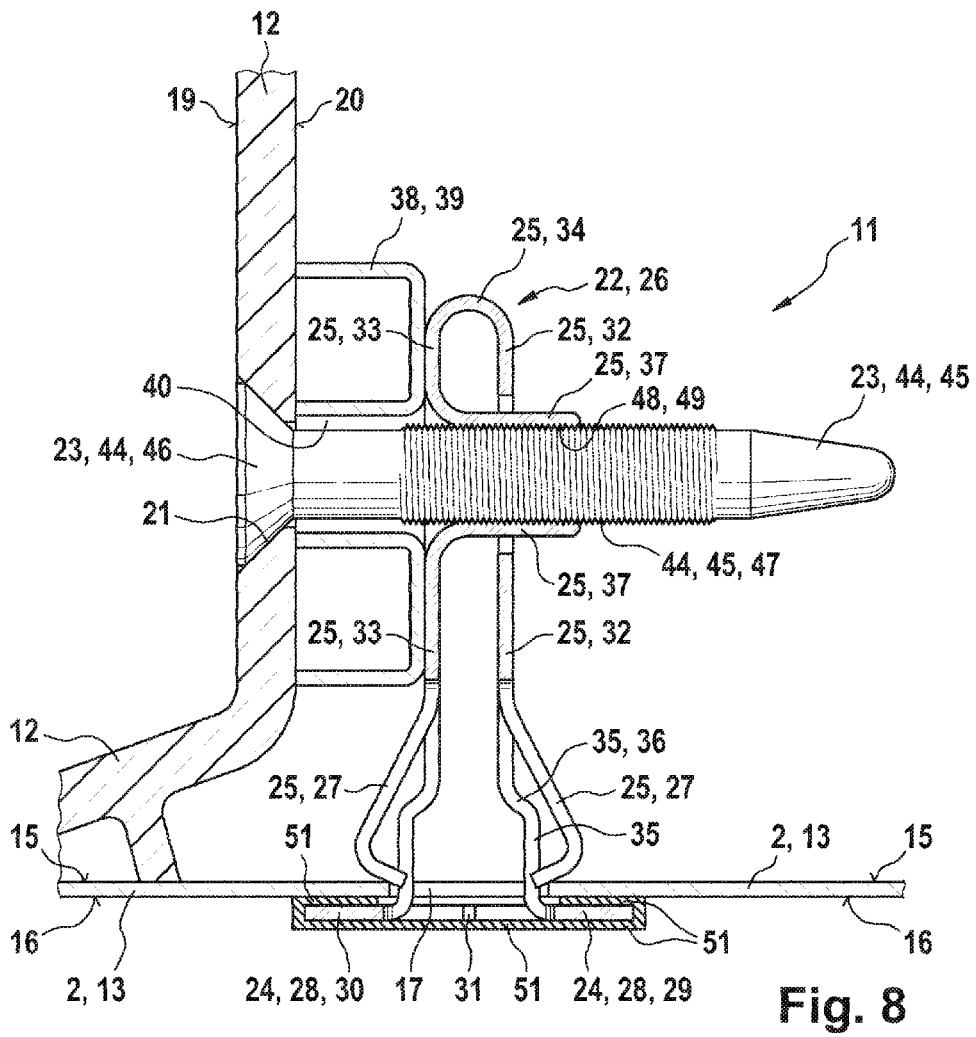
FIG. 8 is a cross section through the device of FIG. 5.

The following detailed description is merely exemplary in nature and is not intended to limit the invention or the application and uses of the invention. Furthermore, there is no intention to be bound by any theory presented in the preceding background of the invention or the following detailed description.

A motor vehicle 1 shown in FIG. 1 has a body structure 2 made from metal, particularly steel, and four wheels 10. Motor vehicle 1 is moved by means of a drive motor 3, for example an electric motor 4, and/or an internal combustion engine 5. Body structure 2 delimits an interior space 9, and two front seats 7 are arranged as seats 6 and three rear seats 8 are arranged as seats 6 inside interior space 9. The three rear seats 8 are combined to form a bench seat.

Body structure 2 is made of steel, and in the area of interior space 9 includes an interior body panel 13 and an exterior body panel 14. Interior body panel 13 and exterior body panel 14 are manufactured at the same time when unmachined body structure 2 is produced. FIG. 2 shows a cross section through body structure 2, and interior body panel 13 is aligned essentially parallel to exterior body panel 14. In a variation of the above, interior body panel 13 may also be aligned at any other angle relative to exterior body panel 14, for example an acute or obtuse angle. Moreover, any geometrically formed retaining structure for fastening a paneling part 12 with a device 11 may also be considered to be the interior body panel. Except for the roof area, interior space 9 of motor vehicle 1 is delimited by a plurality of plastic paneling parts 12. Paneling parts 12 are fastened to body structure 2, particularly interior body panel 13, with detachable fastening elements (not shown), for example retaining clips or screws. If relatively powerful forces are created, particularly in the event of an accident, these fastening elements are not strong enough to keep paneling parts 12 sufficiently fastened to body structure 2, i.e., to prevent paneling parts 12 from coming loose as a result of a substantial relative movement between the paneling parts 12 and body structure 2. The fastening elements (not shown) are needed to enable the paneling parts 12 to be assembled easily, and during servicing operations to enable paneling parts 12 to be removed easily from body structure 2.

The purpose of device 11 is to fasten paneling parts 12 to body work structure 2 in such manner if motor vehicle 1 is involved in an accident that even in the event of an accident and drastic deceleration of the motor vehicle 1 and the powerful forces resulting therefrom, the forces acting on paneling parts 12 do not cause any significant movements of paneling parts 12 relative to body structure 2, so the paneling parts 12 are prevented from becoming completely detached from body structure 2. Consequently, injuries to passengers from detached paneling parts 12 can be avoided, and unobstructed deployment of the airbags in the event of an accident is also ensured.

An exemplary embodiment of device 11 is represented in FIGS. 4 to 8. Interior body panel 13 has an inner side 15 facing toward interior space 9 and an outer side 16 facing away from interior space 9. A rectangular opening 17 is conformed in interior body panel 13. Opening 17 may be shaped differently from the example shown, for example it may be square or circular. The paneling part 12 to be fastened with device 11 has a panel inner side 19 facing toward interior space 9 and a panel outer side 20 facing away from interior space 9. A drill hole 21 is created in paneling part 12.

The device 11 as system includes a first fastening component 22 and a second fastening component 23. Second fastening component 23 is in the form of a rod-like screw 44. Screw 44 has a screw shaft 45 and a screw head 46. An external thread 47 is formed in the axial direction on part of screw shaft 45. First fastening component 22 (FIG. 4) is in the form of a staple structure 26 made from a reshaped and stamped sheet part of metal, for example steel or aluminum. As the first fastening component 22, this staple structure 26 has a first section 24 and a second section 25. The first section 24 is formed from a two-part bearing plate 28, that is to say the bearing plate 28 has a first part 29 and a second part 30, and a slot 31 is provided between each of the two parts 29, 30. Only one of the two slots 31 formed is visible in FIG. 4 because of the perspective view.

Second section 25 includes a first, disc-shaped leg 32 and a second leg 33, also in the form of a disc. Both legs 32, 33 are aligned essentially parallel to one another, and connected to each other at a U-shaped connecting section 34. Two engaging elements 27 are conformed on each of the two legs 32, 33 and are correspondingly deformable. Additionally, each part 29, 30 of bearing plate 28 is connected to one of the two legs 32, 33 by two connecting tongues 35. The connecting tongues 35 each have an angular offset 36 as well. Two circular and matching cavities are conformed in both legs 32, 33, and a cylinder 37 of staple structure 26 is formed and fastened to the cavity on the second leg 33. Staple structure 26 of the deformed and stamped metal sheet is preferably produced as a single part. An internal thread 49 is created on the inside of cylinder 37 as a connector 48. Device 11 further includes an intermediate component 38 as a ring 39 of an annular opening 40 or annular hole 40.

In order to connect paneling part 12 securely to interior body panel 13 by means of device 11, the second section 25 of the first fastening component 22 must first be passed into opening 17 in the direction of interior space 9, so that the second section 24, that is to say bearing plate 28 bears indirectly on the outer side 16 of interior body panel 13. The second section 25 of first fastening component 22 is formed by the staple structure 26 without the bearing plate 28. This second section 25 of the staple structure 26 is designed so that the second section 25 can be passed through opening 17 from an intermediate space 50 between interior body panel 13 and exterior body panel 14 by an assembly operative. To this end, the diameter of the second section 25 is designed to be correspondingly slightly smaller than the diameter of opening 17. Only engaging elements 27 are elastically deformed in the direction of the two legs 32, 33 as they are passed through opening 17 until the four engaging elements 27 elastically regain their original shape after bearing plate 28 bears indirectly on the outer side 16 of interior body panel 13, so that the ends of the engaging elements 27 bear on inner side 15 of interior body panel 13. In this way, staple structure 26 is fastened in positive locking manner to interior body panel 13 in the area of opening 17.

Then, as intermediate component 38, plastic ring 39 as the intermediate component 38 as an auxiliary part supplementing paneling part 12 must be moved into an intermediate space between staple structure 26 and paneling part 12, so that annular hole 40 coincides with the circular cutaways or recesses on the two legs 32, 33 and hole 21 in the paneling. Ring 39 may also be constructed as a single part with paneling part 12 (not shown). Then, screw 44 may be introduced into the hole 21 in the paneling, and the external thread 47 on screw shaft 45 may be screwed together with the internal thread 49 on the cylinder 37 of staple structure 26 until ring 39 is clamped between paneling outer side 20 and the second leg 33 of staple structure 26 by compressive pretension. In this way, paneling part 12 is connected to interior body panel 13 in both positive and force locking manner via device 11. At the same time, the connection between paneling part 12 and interior body panel 13 via device 11 is designed so as to ensure that no relative movements, or practically no such movements are possible between paneling part 12 and interior body panel 13. Angular offsets 36 or inclined elements 36 of connecting tongues 35 are able to be deformed in the event of an accident in such manner that the length of connecting tongues 35 increases and the distance between the first and second legs 32, 33 and bearing plate 28 also increases, thus making it possible to avoid large force peaks on staple structure 26.

There is a risk of moisture formation, that is to say moisture can form in an intermediate space 50 between interior body panel 13 and exterior body panel 14. In order to prevent moisture from being introduced from intermediate space 50 through the opening 17 to paneling part 12 and thus also into interior space 9, device 11 also includes a gasket 51, made from rubber or another, slightly elastic plastic for example. For this purpose, gasket 51 extends around the entire periphery of the opening 17 between the bearing plate 28 and the outside 16 of interior body panel 13. An opening and also slots 31 are present between the two parts 29, 30 of bearing plate 28. This opening and slots 31 are also sealed by means of gasket 51. The geometry of the engaging elements 27 is coordinated such that gasket 51 is clamped with compressive pretension between interior body panel 13 and bearing plate 28. Thus, a secure and reliable seal of opening 17 is guaranteed. In this context, gasket 51 may surround bearing plate 28 completely (not shown). Other variants of gasket 51 are also possible, for example, gasket 51 may be bonded adhesively to bearing plate 28. Gasket 51 may for example be in the form of a foil, a foam or some other flexible material. Moreover, it is also possible to connect gasket 51 to bearing plate 28 in such manner that the bearing plate 28 is over-molded by gasket 51 in an injection molding process.

Figure 9:
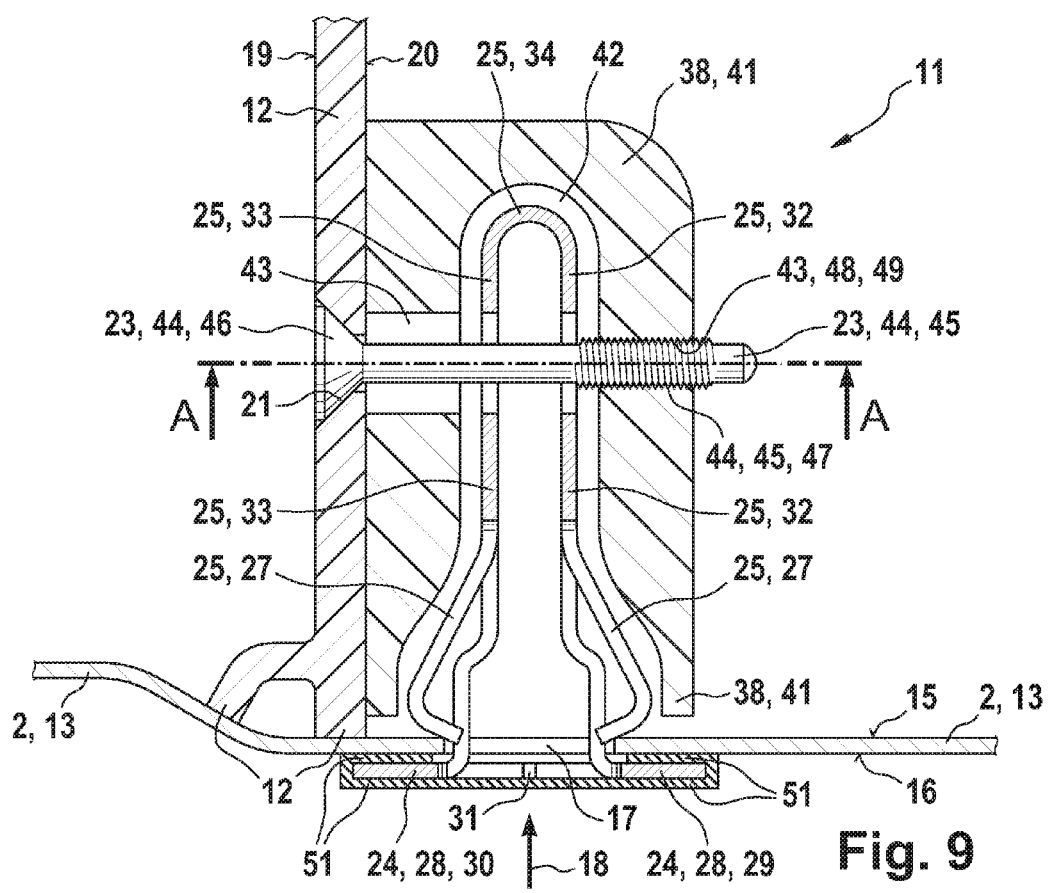
FIG. 9 is a cross section through the device in an embodiment.
Figure 10:
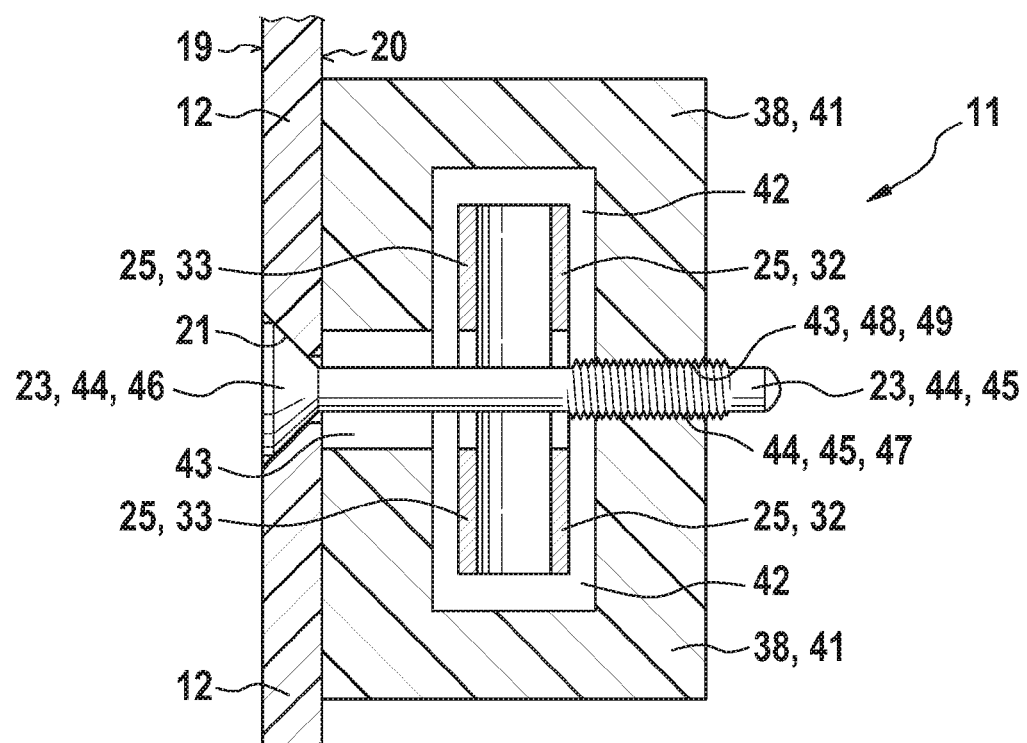
FIG. 10 is a cross section along line A-A of FIG. 9.

An embodiment of device 11 is illustrated in FIGS. 9 and 10. The following text will essentially only outline the differences between this embodiment and the embodiment described with respect to FIGS. 4-8. Staple structure 26 includes a cylinder 37. However, the staple structure 26 in this embodiment might also have a cylinder 37 (not shown) of a kind in which the diameter of the screw shaft 45 is significantly smaller than the diameter of cylinder 37 (not shown). Intermediate component 38 has the form of an intermediate part 41 with a cavity 42 and a drill hole 43 in the intermediate part. The intermediate part 41 is made from plastic, and is connected permanently to paneling part 12. Intermediate part 41 is preferably produced as a single part together with paneling part 12, and is manufactured from plastic by injection molding together with paneling part 12. After the second section 25 of the staple structure 26 or the first fastening component 22 has been passed through opening 17, the second section 25 is fed into cavity 42 and the first section 24 bears on interior body panel 13. Then, screw 44 is introduced into the hole 43 in the intermediate component and cavity 42 through the hole 21 in the paneling, until the external thread 47 on screw 44 can be screwed into an internal thread 49 on intermediate part 41 as the connector 48. In FIG. 9, paneling part 12 is fastened to interior body panel 13 by means of device 11. In this case, there is no contact between staple structure 26 and intermediate part 41 and no contact between screw 44 and staple structure 26. Screw head 46 bears on paneling part 12 in the area of hole 21 in the paneling due to the tensile force in the screw 44 under a compression force. If the motor vehicle is involved in an accident with a direction of accident 18, significant forces initially act on paneling part 12, such that the fastening elements are not sufficient to prevent relative movement between paneling part 12 and body structure 2, that is to say the fastening elements fail. As a result, screw 44 moves relatively in a very small range of a few millimeters relative to staple structure 26, until the screw shaft 45 on the two legs 32, 33 bears on the circular recesses in the two legs 32, 33. Then, the construction of device 11 prevents further movement of the paneling part 12 together with screw 44 and thus also reliably prevents paneling part 12 from becoming detached from body structure 2.

In general, significant advantages are associated with the device 11 according to the present disclosure, the method according to the present disclosure for manufacturing a motor vehicle 1 and the motor vehicle 1 according to the present disclosure. Device 11 is inexpensive to make, and can be fitted easily by an assembly operative. Device 11 serves to fasten paneling part 12 to body structure 2 in such manner that in the case of the first embodiment no relative movement or almost no relative movement is possible between paneling part 12 and body structure 2 and in the case of the second embodiment only slight relative movement is possible between paneling part 12 and body structure 2 during a collision.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A device for fastening a paneling part to a body structure of a motor vehicle, the body structure having a first side facing toward the paneling part and a second side facing away from the paneling part, the device comprising:
    a first fastening component for fastening to an opening in the body structure, wherein the first fastening component has a first section for bearing on the second side of the body structure and a second section for arrangement in the area of the first side of the body structure; and
    a second, rod-like fastening component for fastening the paneling part to the second fastening component;
    wherein the second section of the first fastening component is constructed so that the second section can be passed through the opening in the body structure.

2. The device according to claim 1, wherein the second section is sized to be passed through the opening or the second section has a deformability to be passed through the opening.

3. The device according to claim 1, wherein a deformability of the second section enables the second section to pass through the opening.

4. The device according to claim 3, wherein the second section comprises a at least one deformable engaging element, wherein a diameter of the second section is smaller than a diameter of opening without consideration for the deformable engaging element.

5. The device according to claim 1, wherein the first fastening component comprises at least one deformable engaging element for bearing on the first side of the body structure so that the at least one engaging element bears on the first side of the body structure in area of the opening and the second section bears on the second side of the body structure after the first fastening component has been fastened, and the second section is arranged inside the opening so that the first fastening component is fastened to the body structure.

6. The device according to claim 1, further comprising an intermediate component for arrangement in the area of the first side of body structure between the paneling part and the first fastening component.

7. The device according to claim 6, wherein the intermediate component comprises a ring with an annular hole enabling the second, rod-like fastening component to be received in the annular hole.

8. The device according to claim 6, wherein the intermediate component comprises an intermediate part with a cavity for at least partial accommodation of the second section of the first fastening component.

9. The device according to claim 8, further comprising a connector formed on at least one of the second section of the first fastening component or on the intermediate part for connecting with the at least one second, rod-like fastening component so that the paneling part is connected to the first fastening component via the second, rod-like fastening component through the connection of the at least one second, rod-like fastening component to the connector.

10. The device according to claim 1, wherein the second, rod-like fastening component comprises a screw with an external thread.

11. A motor vehicle comprising a body structure, and at least one paneling part fastened to an interior body panel with at least one device according to claim 1.

12. A method for manufacturing a vehicle body comprising:
    providing a body structure having an exterior body panel and an interior body panel;
    forming at least one opening in the interior body panel;
    fastening at least one paneling part to the interior body panel with a device so that the interior body panel has a first side facing toward the paneling part and a second side facing away from the paneling part including:
        inserting a second section of a first fastening component of the device through the opening in the interior body panel from the second side to the first side;
        engaging a first section of the first fastening component on the second side of the interior body panel; and
        fastening the at least one paneling part to the first fastening component with a second, rod-like fastening component such that movement of the at least one paneling part relative to the body structure is blocked by the second, rod-like fastening component after the at least one paneling part has completed a movement of the at least one paneling part along a given travel path after an accident.

13. The method according to claim 12, further comprising elastically deforming at least one engaging element on the second section from an original shape while the second section of the first fastening component is passed through the opening, and then allowing the at least one engaging element to regain the original shape elastically so that the at least one engaging element bears on the first side of the interior body panel after the elastic recovery to the original shape.

14. The method according to claim 12, further comprising passing the second, rod-like fastening component through a hole in the paneling and connected with at least one of the second section of the first fastening component or an intermediate component.

15. The method according to claim 14, further comprising screwing the second, rod-like fastening component to the second section of the first fastening component.

16. The method according to claim 12, further comprising arranging an intermediate component in the area of the first side of the interior body panel between the paneling part and the second section of the first fastening component.

17. The method according to claim 16, further comprising screwing a connector on the intermediate component to the second section of the first fastening component.

18. The method according to claim 17, further comprising clamping the intermediate component between the paneling part and the second section of the first fastening component with a compressive force due to a tensile force in the second, rod-like fastening component.

* * * * *